United States Patent
Layton et al.

(10) Patent No.: US 10,580,288 B2
(45) Date of Patent: Mar. 3, 2020

(54) ALERT FAULT DETECTION SYSTEM AND METHOD

(71) Applicants: BlackBerry Limited, Waterloo (CA); 2236008 Ontario Inc., Waterloo (CA)

(72) Inventors: Leonard Charles Layton, Vancouver (CA); Frank Linseisen, North Vancouver (CA); Michael Andrew Percy, Vancouver (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 16/006,155

(22) Filed: Jun. 12, 2018

(65) Prior Publication Data
US 2019/0378401 A1  Dec. 12, 2019

(51) Int. Cl.
| | |
|---|---|
| G08B 29/10 | (2006.01) |
| G08B 29/12 | (2006.01) |
| G11B 20/10 | (2006.01) |
| G11B 20/18 | (2006.01) |
| G11B 20/12 | (2006.01) |

(52) U.S. Cl.
CPC ...... *G08B 29/126* (2013.01); *G11B 20/10527* (2013.01); *G11B 20/12* (2013.01); *G11B 20/18* (2013.01)

(58) Field of Classification Search
CPC ........ G08B 29/14; G08B 29/00; G08B 29/02; G08B 29/04; G08B 29/06; G08B 29/10; G08B 29/126; G11B 20/10527; G11B 20/12; G11B 20/18
See application file for complete search history.

(56) References Cited

U.S. PATENT DOCUMENTS

| | | | | |
|---|---|---|---|---|
| 4,037,222 A * | 7/1977 | Solomon | ................ | G08B 29/10 181/139 |
| 4,843,378 A * | 6/1989 | Kimura | ................ | G08B 29/02 340/292 |
| 5,151,682 A * | 9/1992 | Marinitsch | .............. | B60R 25/10 340/514 |
| 5,450,059 A * | 9/1995 | Arroubi | ................ | A47J 42/56 340/514 |
| 5,652,566 A * | 7/1997 | Lambert | ................ | G08B 29/10 340/506 |
| 5,706,399 A * | 1/1998 | Bareis | ..................... | B60R 25/04 704/231 |
| 7,058,190 B1 * | 6/2006 | Zakarauskas | .......... | H04R 29/00 381/122 |
| 7,292,141 B2 * | 11/2007 | Staats | ..................... | G08B 3/10 340/539.12 |

(Continued)

*Primary Examiner* — Hai Phan
*Assistant Examiner* — Son M Tang
(74) *Attorney, Agent, or Firm* — Rowand LLP (57) ABSTRACT

A method and system of fault detection for an alert generation system. In the audio alert generation system, a stored digital alert audio file is selected to be processed to generate an analog audio signal to drive a speaker. An alert fault detection system obtaining a signal from the audio alert generation system, converts the obtained signal to a digitally-formatted obtained audio signal, detects a fault in the audio alert generation system by comparing the digitally-formatted obtained audio signal with the stored digital alert audio file, and triggers a fault indicator.

17 Claims, 5 Drawing Sheets

(56) References Cited

U.S. PATENT DOCUMENTS

| | | | |
|---|---|---|---|
| 9,641,918 B2* | 5/2017 | Staudenmaier | G08B 1/08 |
| 10,114,927 B2* | 10/2018 | Falck | G16H 40/63 |
| 2007/0109115 A1* | 5/2007 | Kiani | A61B 5/1455 |
| | | | 340/507 |
| 2007/0233438 A1* | 10/2007 | Quimper | G05B 23/0278 |
| | | | 703/6 |
| 2009/0066499 A1* | 3/2009 | Bai | G10K 15/02 |
| | | | 340/459 |
| 2009/0085873 A1* | 4/2009 | Betts | G08B 13/1427 |
| | | | 345/169 |
| 2009/0295591 A1* | 12/2009 | Bedingfield | A61M 1/14 |
| | | | 340/660 |
| 2010/0085195 A1* | 4/2010 | Bennett | G08B 29/10 |
| | | | 340/577 |
| 2010/0201515 A1* | 8/2010 | Fleming | H04L 67/125 |
| | | | 340/539.23 |
| 2011/0013779 A1 | 1/2011 | Arthur | |
| 2011/0087079 A1* | 4/2011 | Aarts | A61B 7/003 |
| | | | 600/300 |
| 2012/0253821 A1* | 10/2012 | Kamiya | G10L 99/00 |
| | | | 704/270.1 |
| 2012/0286946 A1 | 11/2012 | Karl et al. | |
| 2013/0249680 A1* | 9/2013 | Goto | B60Q 5/008 |
| | | | 340/425.5 |
| 2015/0077243 A1* | 3/2015 | Hooper | H02H 3/16 |
| | | | 340/532 |
| 2015/0117649 A1* | 4/2015 | Nesta | H04R 3/005 |
| | | | 381/17 |
| 2015/0332584 A1* | 11/2015 | Tenkama | A61B 5/0205 |
| | | | 340/516 |
| 2015/0350779 A1* | 12/2015 | McNutt | H04R 3/002 |
| | | | 381/71.1 |
| 2016/0055070 A1* | 2/2016 | Ito | G06F 11/3037 |
| | | | 714/43 |
| 2016/0135758 A1* | 5/2016 | Sabota | A61G 11/00 |
| | | | 340/573.1 |
| 2016/0152217 A1* | 6/2016 | Yamamoto | B60T 8/1708 |
| | | | 701/70 |
| 2016/0240181 A1* | 8/2016 | McNutt | G10K 11/002 |

* cited by examiner

ALERT FAULT DETECTION SYSTEM AND METHOD

FIELD

The present application generally relates to human-machine interface systems for alerting humans and, in particular, to methods and systems for detecting faults in such systems.

BACKGROUND

Alert generation systems are used to produce an alert to signal a particular state or condition to a human. The alert is visual, audible, or haptic, or a combination of two or more of these. An example alert is an audible tone, chirp, chime or other sound pattern. Such an alert generation system may be used to generate a number of different alerts on command from a variety of other systems or subsystem. For example in a vehicle, an alert generation system may be configured to generate audible alerts for a lane-departure warning system, a turn-signal system, an near-object (pedestrian or parking) detection system, or any number of other such systems. These systems may be safety related, but are not always safety related.

The proper functioning of the alert generation system can be important, particularly if the alerts relate to safety warnings. Unfortunately, the alert generation system has multiple points of potential failure. Moreover, it would be difficult for the human occupant to recognize failure of the system since it will likely simply remain silent.

It would be advantageous to provide for enhanced reliability of an alert generation system.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In a first aspect, the present application describes a method of fault detection for an alert generation system. The alert generation system may be an audio alert generation system. The method includes, in the audio alert generation system, selecting a stored digital alert audio file to be processed to generate an analog audio signal to drive a speaker. The method then further includes, in an alert fault detection system, obtaining a signal from the audio alert generation system, converting the obtained signal to a digitally-formatted obtained audio signal, detecting a fault in the audio alert generation system by comparing the digitally-formatted obtained audio signal with the stored digital alert audio file, and triggering a fault indicator.

In another aspect, the present application describes an alert fault detection system for fault detection in an alert generation system. The alert generation system may be an audio alert generation system, wherein the audio alert generation system includes a speaker, an audio path, and a stored digital alert audio file to be processed in the audio path to generate an analog audio signal to drive the speaker. The alert fault detection system includes a processor; a memory coupled to the processor; an input for obtaining a signal from the audio alert generation system; and a fault detection module including processor executable instructions stored in the memory that, when executed, cause the processor to convert the obtained signal to a digitally-formatted obtained audio signal, detect a fault in the audio alert generation system by comparing the digitally-formatted obtained audio signal with the stored digital alert audio file, and trigger a fault indicator.

In yet a further aspect, the present application describes non-transitory computer-readable storage medium storing processor-readable instructions that, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application relates to human-machine interfaces designed to signal an alert or alarm to a human. The terms "alert" and "alarm" are used interchangeably in the description below and are generally intend to be sensible signals to a human user or occupant, typically used to attract the human's attention to a current state of the machine. In many situations, the alert or alarm may be a warning to the human. The examples below focus upon auditory signals, such as an audible set or pattern of sounds, but some implementations may involve non-auditory alarms or alerts. For example the sensible signals may be visual (e.g. a flashing light, icon, or the like) or haptic/kinesthetic (e.g. a pattern of vibrations) or any combination of sensible signals.

Alert generation finds particular application in human-machine environments such as vehicles. Vehicles have developed a specific hardware-software subsystem for generating audible alerts using a dedicated electronic control unit (ECU), typically referred to as the "chime generator" ECU.

Figure 1:
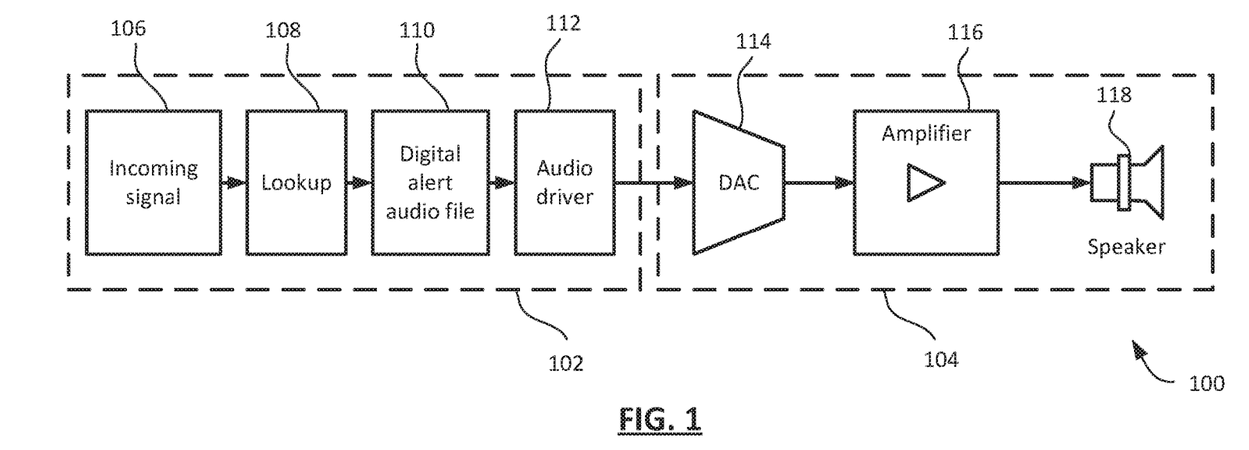
FIG. 1 shows a simplified example of an alert generation system.

FIG. 1 shows, in block diagram form, one example of an alert generation system 100. The alert generation system 100 in this example is an audio alert generation system. The system 100 includes a substantially software component 102 and a substantially hardware component 104. It will be appreciated that the software aspects of the system 100 may be implemented by way of processor-executable instructions executed by one or more processors. The processors may include a microprocessor and memory storing the instructions, a microcontroller, an application-specific integrated chip (ASIC), or any other such computing structure.

The software component 102, generally, selects a stored audio file for the type of alert to be output and converts the stored audio file into a bitstream of digital audio data. This bitstream of digital audio data is passed to the hardware component 104 via a suitable interface. The hardware component 104 generates an audible alert from the bitstream of digital audio data.

The software component 102 may be triggered by an incoming signal 106. The incoming signal 106 may be an interrupt or other such signal from another software component. For example, in the case of a vehicle, other on-board components may generate a signal that corresponds to a particular alert. The incoming signal 106 may include data indicating an alert type or a component from which the signal originated. The software component 102 retrieves a stored digital alert audio file 110 corresponding to the alert type or component from which the signal originated, as indicated by the lookup 108 operation. The stored digital alert audio file 110 may be in compressed or uncompressed format. In one example, the stored digital alert audio file 110 is a WAV file, although other audio file types may be used in other embodiments.

Once retrieved, the stored digital alert audio file 110 is provided to an audio driver 112. The audio driver 112 generates a bitstream of digital data from the stored digital alert audio file 110. The audio driver 112 partly serves as an interface between the software domain and the hardware domain. In some cases, the audio driver 112 may decode encoded audio data in the format of the stored digital alert audio file 110 to generate the bitstream.

The bitstream of digital audio data is input to a digital-analog converter (DAC) 114 within the hardware component 104. The DAC 114 coverts the digital audio data bitstream into an analog audio signal, which is then input to an amplifier 116 and used to drive a speaker 118. In this manner, the alert represented by the stored digital alert audio file 110 is output as acoustic data from the speaker 118.

The playback chain described above functions to output alarms or alerts to a human, such as a driver in the case of a vehicle. These alerts and alarms may provide critical information to the human. For example, the alert or alarm may signal an imminent danger detected by the vehicle's pedestrian-detection system, parking assist system, on-board diagnostic system, or any other such system. It will also be noted that the playback chain for audio alerts contains a number of points of potential failure, which can occur in software or hardware. Failure of the audio alert system could have serious consequences.

The present application describes an alert fault detection subsystem (AFDS) that monitors the audio alert generation system with a view to detecting a fault and outputting a fault indicator. In general, the AFDS obtains a signal from the alert generation system, converts that signal to digital and to a particular format, if necessary, and compares it to an expected signal, such as the original audio file or the bitstream of digital audio. More than a threshold difference between the obtained signal and the expected signal may indicate a failure of the alert generation system. An indication of the failure can be provided through another (fallback) alert system to alert the human/driver.

Figure 2:
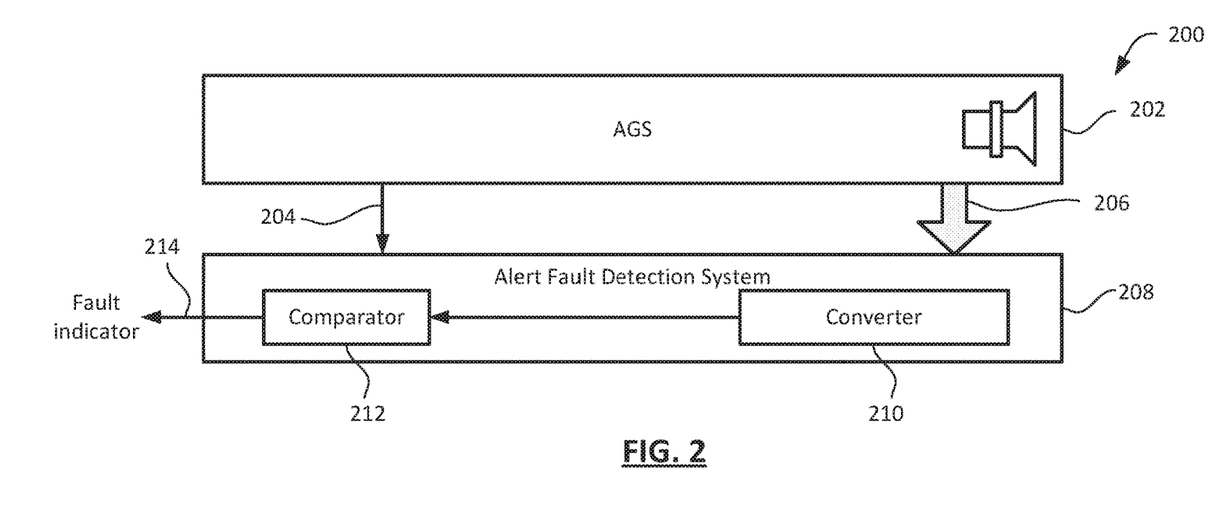
FIG. 2 shows, in block diagram form, an example of an alert fault detection system for monitoring operation of an alert generation system.

Reference is now made to FIG. 2, which shows a simplified example of a system 200 for fault detection in an alert generation system 202. The system 200 includes the alert generation system 202 and an alert fault detection system 208. The alert generation system 202 generates an alert to be sensed by a human, such as an audible alert sound. The alert fault detection system 208 obtains source data 204 for the alert from the alert generation system. The source data 204 may include, for example, the stored digital alert audio file for the particular alert. In some cases, the alert fault detection system 208 has obtained the source data 204 in advance for all possible alert types.

The alert fault detection system 208 further obtains a signal 206 from the alert generation system 202. The signal 206 may be obtained from various points in the alert playback path, as will be described in further detail below. In one example, the signal 206 is a digital representation of the alert signal, such as the bitstream generated by an audio driver. In another example the signal 206 is an analog electrical signal, such as the input to the amplifier, or the output from the amplifier. In yet another example, the signal 206 is an acoustic signal obtained using a transducer (microphone) to capture the acoustic signal produced by a speaker playing the alert noise. In yet other examples, the signal 206 is two or more of these examples.

The alert fault detection system 208 may include a converter 210 to process the signal 206 to put it into the same form and format as the source data 204. For example, in the case of an acoustic signal, the converter 210 may include amplifying, filtering, digital-to-analog (DAC) conversion, and coding (using an applicable CODEC corresponding to the source data 204. In some embodiments, the source data 204 may be a decompressed bitstream of digital audio and the converter 210 need only process the obtained signal 206 to put it into the digital domain.

Once the obtained signal 206 is in the same digital format as the source data 204, a comparator 212 evaluates whether the obtained signal 206 sufficiently matches the source data 204. The match may not be exact due to distortions in the CODEC process, the ADC operation, any filters, the non-linearities of any transducers, including any speaker or microphone in the path, and any other sources of distortion or noise. Accordingly, the comparator 212 may be configured to allow for reasonable variation between the source data 204 and the obtained signal 206. Any number of techniques for implementing a suitable comparison function may be used, including pattern matching techniques that may involve machine learning or neural networks, adaptive filters, matched filters, etc.

The comparator 212 outputs a fault indicator 214. The fault indicator 214 may be an interrupt or similar signal to another system for signaling the likely failure in the alert generation system 202. The interrupt may cause a fault condition in the other system, such as illumination of a check engine light or a similar indicator of a fault. In some cases, the fault indicator 214 may cause a message to be transmitted to an associated device, such as a mobile number or a smartphone application associated with the vehicle or to a third party system, such as a remote monitoring system for emergencies, such as OnStar™ or the like. In some cases, the fault indicator 214 may cause another indication of the fault, such as through a haptic feedback system that serves as an alternative alert system to the audio alert generation system. In yet another implementation, the fault indicator 214 causes rerouting of the alert signal from the alert generation system 202 to a backup system. For example, the stored digital alert audio file may be played back by an alternative system, such as an emergency audio system (e.g. eCall), which typically includes its own audio playback path and speaker system.

It will be appreciated that portions, or all, of the alert fault detection system 204 may be implemented by way of software, i.e. processor-executable instructions that, when executed by one or more processors, cause the processors to carry out the described operations. For example, the processing and/or conversion of the audio signal into the desired digital format may be implemented by way of software instructions. Likewise, the comparison between the source data 204 and the digitally-processed obtained signal may be carried out by way of software-implemented instructions. That is, a suitably programmed processor may implement the pattern matching or comparator functions described for assessing whether the obtained signal sufficiently matches the original alert audio file. These software-implemented operations may be described herein as a fault detection module, but the term "module" is not intended to imply any particular programming language or structure and may be used interchangeably with application, component, program, or the like. The fault detection module may be implemented, in some cases, as an application-specific integrated circuit or the like.

Figure 3:
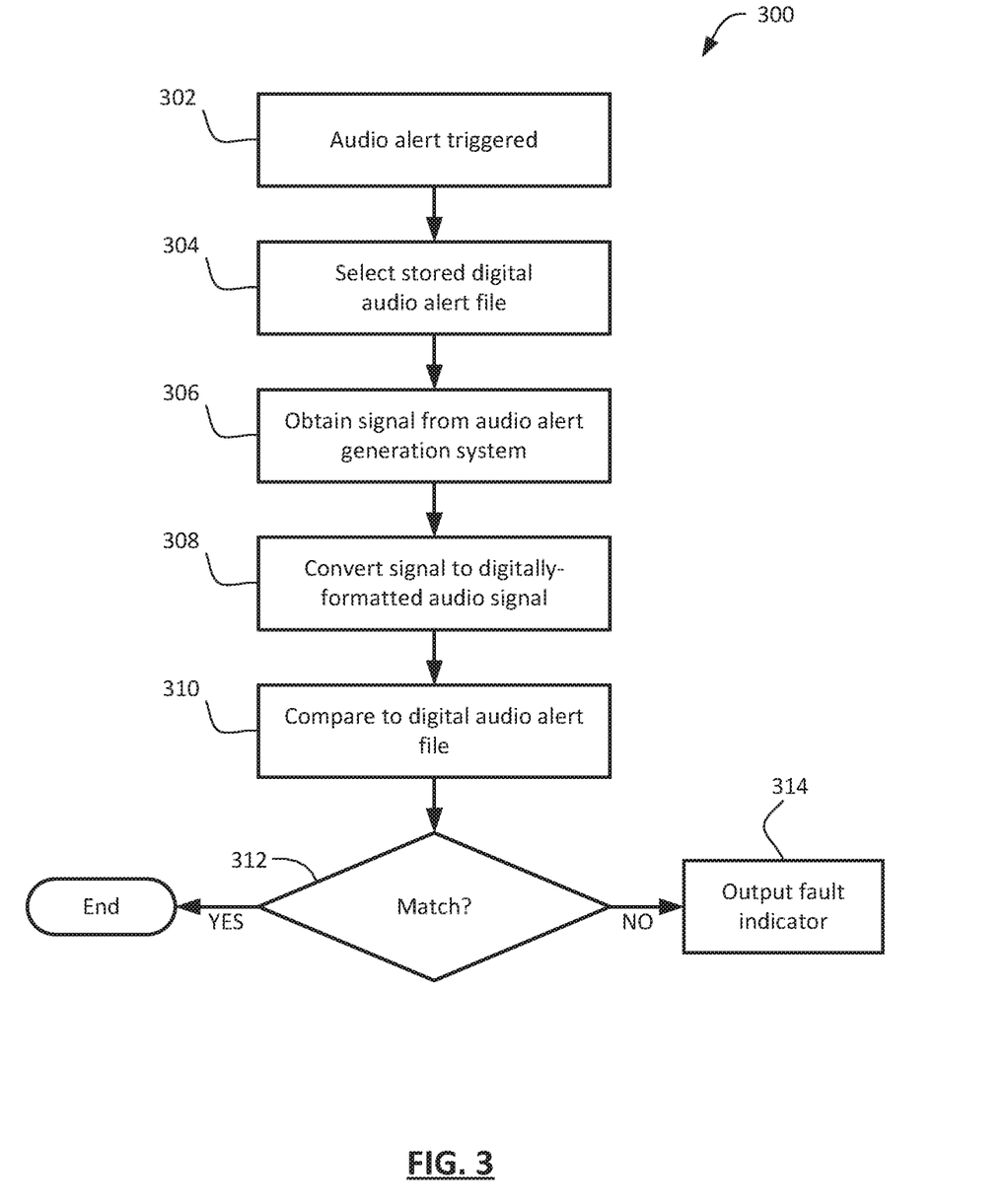
FIG. 3 shows a flowchart illustrating an example method of detecting a fault in an alert generation system.

Reference is now made to FIG. 3, which shows, in flowchart form, a simplified example of a method 300 of fault detection for an audio alert generation system. In this example, the method 300 relates to audio alerts within a vehicle. The method 300 includes receiving an audio alert trigger signal in operation 302. The audio alert trigger signal may be received by the alert generation system from another system, such as a lane departure warning system, a pedestrian detection system, a parking assist system, or any similar such systems. In many examples, the system providing the audio alert trigger signal may be a safety-related system designed to alert a human vehicle occupant to a potential danger, but it is not necessarily safety related. As examples, the audio alert may be received from an electronic toll payment system to signal payment of a toll, from an entertainment system to signal state of a video or audio entertainment application, or from a hands-free cellular system to signal an incoming voice call. Other vehicle-related systems that may feature an audio alert will be appreciated by persons ordinarily skilled in the art.

Having received the audio alert trigger signal, in operation 304 the alert generation system selects a corresponding stored digital audio alert file. The alert generation system may have a plurality of stored audio files each corresponding to a particular alert chirp, chime, tone or the like. The audio files may be compressed or uncompressed. The format for storing the audio files may be selected based on memory size constraints, encoding/decoder (CODEC) complexity and processing resources constraints, or other factors. In one example, the audio files are stored in WAV format. Due to the short duration of most alerts and the lack of need for wideband stereo sounds for alerts, many implementations may use an uncompressed pulse-code modulation format, such as WAV.

It will be appreciated that operations 302 and 304 occur within the software component of the alert generation system. The alert generation system then goes on to attempt to playback the selected digital audio alert file, by loading it to an audio driver that then sends a bitstream of audio data to a DAC, which then produces an analog audio signal that is routed to an amplifier and then to a speaker (various filters and other circuit details are omitted).

Within the alert fault detection system, a signal is obtained from the alert generation system in operation 306. This signal is obtained from some point in the playback path. The signal may be obtained from the output of the audio driver in digital format; it may be obtained from an analog portion of the electrical path between the DAC and the speaker; or it may be obtained acoustically using a microphone or other acoustic transducer to create an obtained signal from the sound generated by the speaker.

The alert fault detection system then converts the obtained signal into a digitally-formatted obtained signal in operation 308. The conversion depends on the type of signal obtained and is generally aimed at ensuring that the obtained signal is in the same format as the digital audio alert file so as to facilitate comparison. If the signal is an electric signal from a microphone, then the conversion involves possibly amplifying and filtering the signal, converting it from analog to digital, and processing the digitized signal to put it in a format equivalent to that of the digital audio alert file. If the signal is a digital signal from the output of the audio driver in the alert generation system then the conversion operation 308 may require minimal processing.

In operation 310, the digitally-formatted obtained signal is compared with the digital audio alert file. In practice, this comparison may involve pattern matching and may be tuned to permit a certain degree of mismatch, particularly in the case of an acoustically-obtained signal which will be subject to ambient noise, noise from analog components, non-linearities in the speaker and microphone, and other sources of error. In operation 312, the comparator determines if a sufficient match is found between the obtained signal and the expected alert. If so, then the alert fault detection system determines that the alert generation system is functioning as expected. If not, then the alert fault detection system outputs a fault indicator in operation 314. As discussed above, the fault indicator may trigger one or more of a number of actions to signal the fault condition.

In some embodiments, the alert fault detection system may operate in response to a trigger signal from the alert generation system signaling that it is about to issue an alert. In some other embodiments, the alert fault detection system may operate in a continuous monitoring state. For example, the alert fault detection system may output a signal indicating when it has determined that an alert has been output by the alert generation system. In that manner, if the alert generation system outputs an alert (or attempts to) and no corresponding detection signal is output by the alert fault detection system, then it is clear that the alert generation system failed.

Figure 4:
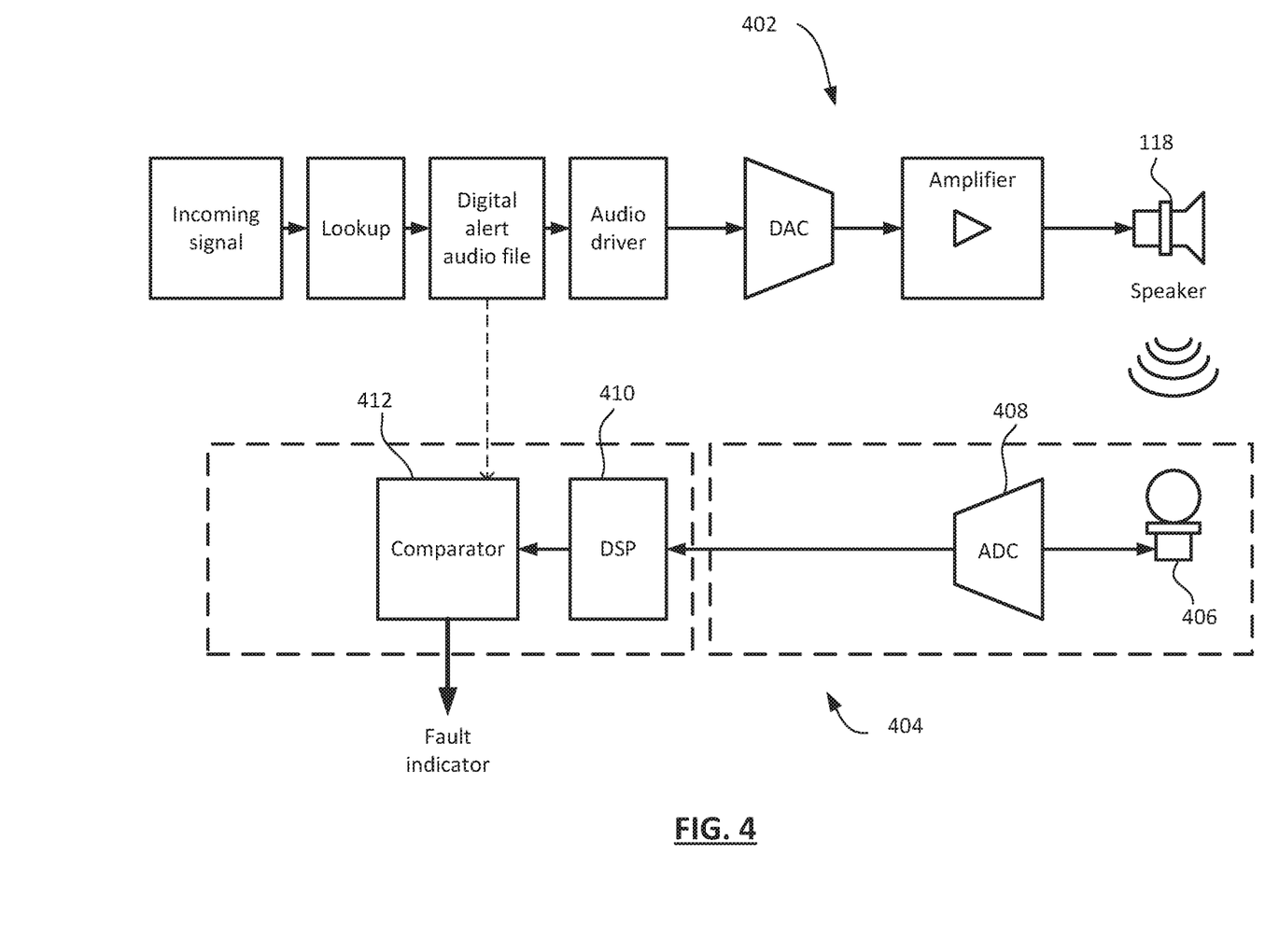
FIG. 4 shows a first example of alert fault detection involving sensing acoustic signals.

As noted above, there are a number of possible points from which the alert fault generation system can obtain a signal from the alert generation system in order to evaluate whether it is functioning correctly. FIG. 4 shows a block diagram of one example embodiment in which an alert fault detection system 404 relies on detecting acoustic signals in the vehicle cabin. In this example, an alert generation system 402 is triggered by a software signal to generate a particular alert. The alert generation system 402 retrieves the corresponding digital alert audio file and processes it to generate a bitstream of audio data, which is then converted to analog, amplified and output by a speaker.

The alert fault detection system 404, in this example embodiment, receives a copy of the digital alert audio file from the alert generation system 402. This is one example of receiving a trigger signal from the alert generation system 402 signaling that an alert is about the output. In some other embodiment, the alert fault detection system 404 receives trigger signal containing an index or other identifier for the file, which it then retrieves from its own stored set of files. In yet other embodiments, the alert fault detection system 404 simply receives a trigger signal indicating an alert is to be generated without an indication of the alert type. In the latter case, the alert fault detection system 404 has a plurality of alert audio files and can compare the obtained signal against each of them to search for a sufficient match.

In this example, the alert fault detection system 404 includes a microphone 406, which detects sound generated by the speaker from the alert generation system 402. It will be appreciated that the microphone 404 may further pick up other audio and noise from within the vehicle. Various filters (not shown) and other signal conditioning techniques may be used to try to minimize the impact of noise or of distortion due to analog components.

The microphone 406 may be located within the vehicle cabin and may be dedicated to the alert fault detection system 404. In some instances, the microphone 406 may be shared with one or more other systems. For example, the microphone 406 may be used for speech input and/or for an active noise cancellation system.

The obtained signal from the microphone 406 is converted to digital by an analog-to-digital converter (ADC) 408, and is then processed by a digital signal processor (DSP) 410. The DSP 410 may be an audio driver in some instances. The DSP 410 functions to put the obtained signal into the same digital form as the stored audio files to enable comparison between them. A comparator 412 evaluates whether the obtained signal is sufficiently similar to the audio expected based on the digital alert audio file. If the obtained audio signal is not a sufficient match to the expected audio, the comparator 412 issues a fault indicator.

In some implementations of the acoustic monitoring option, because of the likelihood of extraneous noise being picked up by the microphone 406, filtering may be used to focus upon a particular portion of the acoustic spectrum less likely to encounter interference. By filtering the audio file in a similar manner, the comparator 412 can evaluate whether the alert generation system 402 properly generated the alert acoustics.

It will be appreciated that the acoustic option has a drawback in that a fault may occur in the microphone that would appear as a fault in the alert generation system 402. On the one hand, this is not a safety concern insofar as it only results in false positives for fault indication, and does not lead to missed faults. Nevertheless, to address this concern, in some implementations, redundant microphones may be used.

In yet a further embodiment, the microphone may be continuously or periodically evaluated (aside from trying to detect alerts) by determining whether the microphone is accurately picking up sound from other systems, such as a radio/entertainment system. In one instance, the microphone may be tested by determining whether it senses an increase in road/wind noise correlated to an increase in vehicle speed. The absence of such a detected noise increase is indicative of a possible microphone fault.

Figure 5:
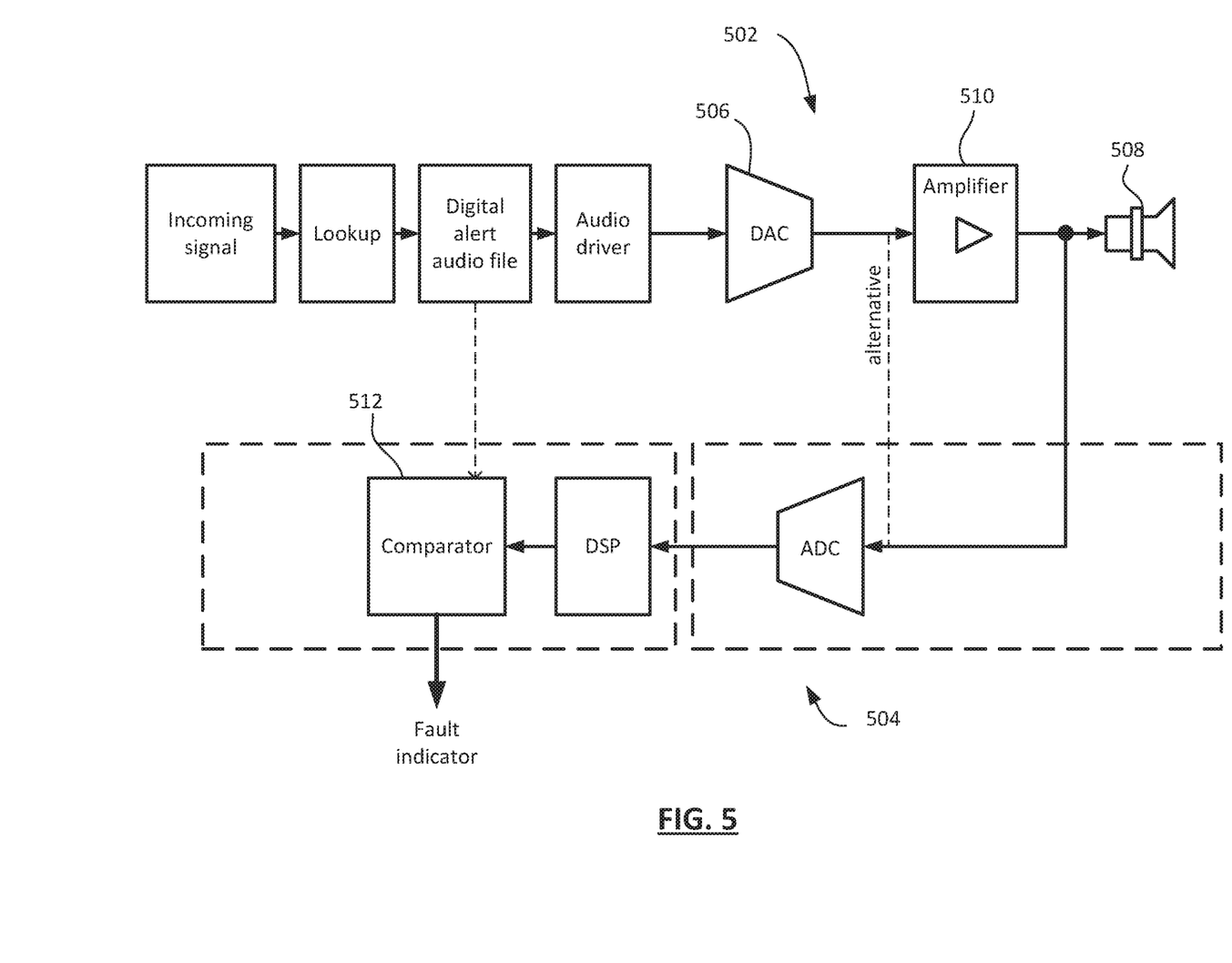
FIG. 5 shows a second example of alert fault detection involving sensing analog electrical signals.

Reference is now made to FIG. 5, which diagrammatically illustrates another embodiment in which an alert fault detection system 504 obtains a signal from the analog electrical path of an alert generation system 502. The analog electrical path includes from a DAC 506 to a speaker 508. In the illustrated example, the signal is obtained from the output of an audio amplifier 510 before it is used to drive the speaker 508. In some other embodiments, the signal may be obtained from the input to the amplifier 510. In yet further embodiment, the signal may be obtained from measuring the current driving the speaker 508 at one of the speaker coils. In any case, the obtained signal is then converted to digital and suitably processed for use in a comparator 512.

Figure 6:
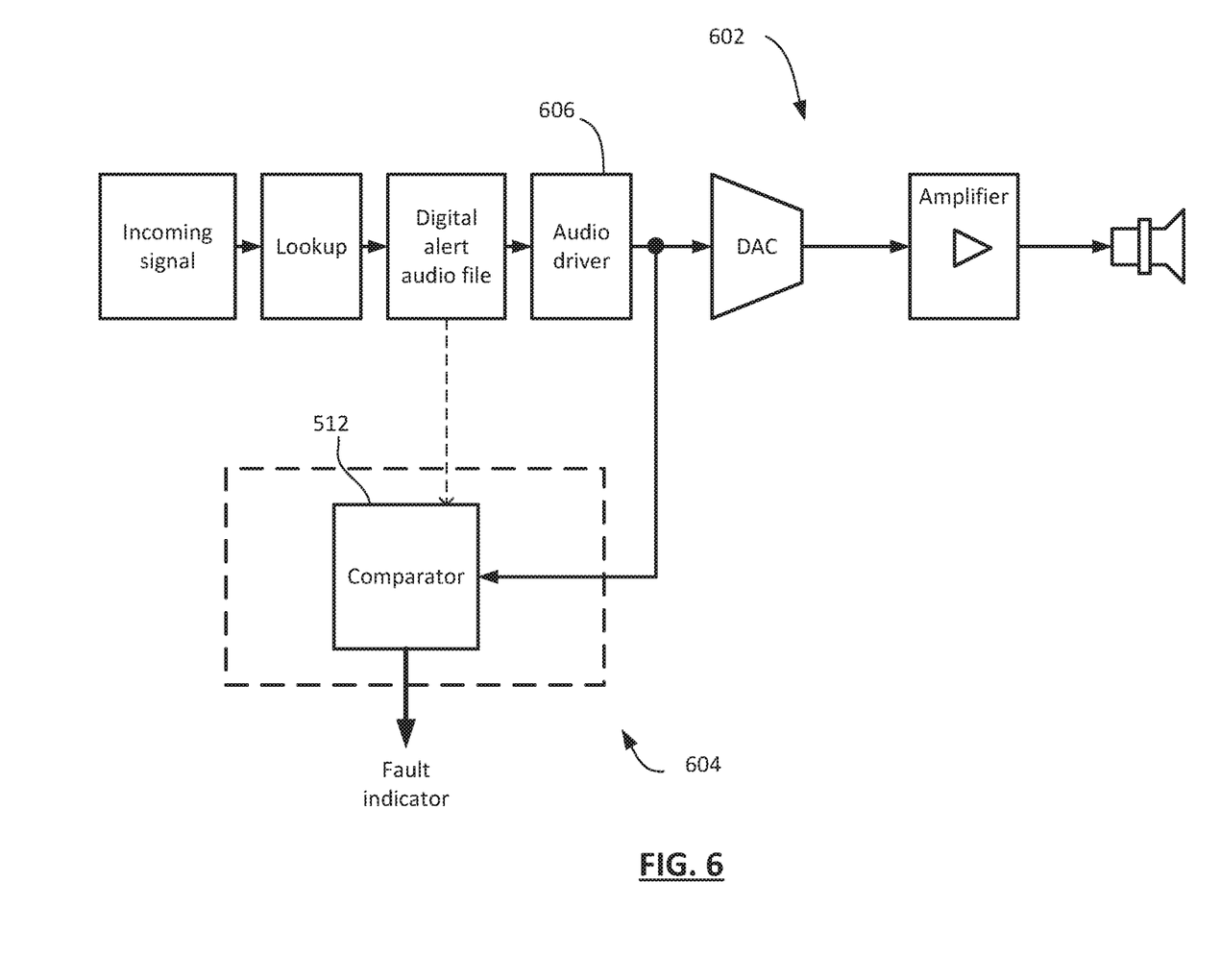
FIG. 6 shows a third example of alert fault detecting involving obtaining digital signals from an alert generation system.

Yet another example embodiment is shown in FIG. 6, which illustrates a case in which an alert fault detection system 604 obtains a signal from the digital portion of an alert generation system 502. In this example, no processing of the obtained signal may be necessary if it has the same format after an audio driver 606 produces a bitstream from the digital alert audio file. Accordingly, a comparator 608 may be able to directly compare the obtained signal with the expected signal based on the digital alert audio file. The function of this embodiment is to determine whether the audio driver 606 is functioning correctly. In some cases, the audio driver 606 may be dysfunctional or may be disabled (for example if a "mute" function is inadvertently triggered within the audio driver or associated software components). In some cases, the audio driver software may get hung-up and require rebooting, in which case no bitstream of audio will be output and the alert fault detection system 604 would generate a fault indicator. Obtaining the signal in this example may involve reading the output buffer associated with the audio driver.

In yet other embodiments, the alert fault detection system may obtain signals from more than one point in the alert generation path. In one example, the alert fault detection system may obtain a signal acoustically and may obtain an analog electrical signal from the signal path in the alert generation system. These two obtained signals may be compared to each other to confirm correction operation of the speaker and either or both may be compared with the digital alert audio file to confirm correct operation of the audio driver and DAC. In other variations, the alert fault detection system may obtain signals from two, three or more points and may compare each of them to each other or to the original audio file. This may be termed "cascaded" fault detection.

In some embodiments, the alert fault detection system may be implemented with a standalone battery and its own protective casing, much like the temporal, spatial independence and separation sufficient to comply with ISO 26262 regarding Automotive Safety Integrity Level (ASIL).

Many of the above-described embodiments focus on auditory alerts. The described alert fault detection system may be applied more generally to other sensory alerts including visual and/or haptic alerts. For example, a haptic alert system may induce a vibratory alert or pattern into a steering wheel, driver's seat, or other object that the human may be expected to contact or be in close proximity to. The alert fault detection system may obtain similar digital and/or analog electrical signals from a haptic alert generation system, as described above for the case of audio alerts. The alert fault detection system may include one or more accelerometers instead of microphones for detecting induced vibrations and converting the detected vibrations to obtained signals for comparison to a stored haptic alert file.

The subject matter of the disclosure herein may also relate, among others, to the embodiments of the following clauses:

AA. A method of fault detection for an audio alert generation system (202), the method comprising: in the audio alert generation system, selecting a stored digital alert audio file (204) to be processed to generate an analog audio signal to drive a speaker; and, in an alert fault detection system, obtaining a signal (206) from the audio alert generation system (202), converting (210) the obtained signal to a digitally-formatted obtained audio signal, detecting a fault in the audio alert generation system by comparing (212) the digitally-formatted obtained audio signal with the stored digital alert audio file (204), and triggering a fault indicator (214).

BB. The method of clause AA, wherein obtaining the signal includes obtaining the signal from a microphone measuring sound.

CC. The method of clause BB, wherein converting the obtained signal includes analog-to-digital conversion.

DD. The method of clause BB or CC, wherein the method further comprises the alert fault detection system obtaining an analog electrical signal from the audio alert generation system at a point between a digital-to-analog converter and the speaker, converting the analog electrical signal into a second digitally-formatted obtained audio signal, and wherein detecting the fault further includes comparing the second digitally-formatted obtained audio signal with the stored digital alert audio file and comparing the second digitally-formatted obtained audio signal with the digitally-formatted obtained audio signal.

EE. The method of clause AA, wherein obtaining the signal includes obtaining an analog electrical signal from the audio alert generation system at a point between a digital-to-analog converter and the speaker.

FF. The method of clause EE, wherein converting the obtained signal includes analog-to-digital conversion.

GG. The method of clause AA, wherein obtaining the signal includes obtaining a digital bitstream signal from an audio driver within the audio alert generation system.

HH. The method of any one of clauses AA to GG, further comprising the alert fault detection system receiving a trigger signal prior to the obtaining, wherein the trigger signal signals that an alert is about the generated by the audio alert generating system.

II. The method of clause HH, wherein the trigger signal includes the digital alert audio file or an identifier for the digital alert audio file.

JJ. The method of any one of clauses AA to II, wherein detecting the fault includes determining that the digitally-formatted obtained audio signal differs from the stored digital alert audio file by more than a threshold amount.

KK. The method of any one of clauses AA to JJ, wherein the audio alert generation system and the alert fault detection system are located within a vehicle.

LL. The method of any one of clauses AA to KK, wherein triggering a fault indicator includes at least one of outputting a fault signal, visually signaling a fault condition, haptically signaling a fault condition, or transmitting a message to a remote device regarding the fault.

MM. An alert fault detection system (208) for fault detection in an audio alert generation system (202), wherein the audio alert generation system includes a speaker, an audio path, and a stored digital alert audio file (204) to be processed in the audio path to generate an analog audio signal to drive the speaker, wherein the alert fault detection system comprises: a processor; a memory coupled to the processor; an input for obtaining a signal (206) from the audio alert generation system (202); and a fault detection module including processor executable instructions stored in the memory that, when executed, cause the processor to convert (210) the obtained signal to a digitally-formatted obtained audio signal, detect a fault in the audio alert generation system by comparing (212) the digitally-formatted obtained audio signal with the stored digital alert audio file (204), and trigger a fault indicator (214).

NN. The alert fault detection system of clause MM, wherein the input includes a microphone to obtain the signal from the acoustic environment.

OO. The alert fault detection system of clause NN, wherein the input further includes an analog-to-digital converter to convert an analog signal obtained by the microphone into the signal.

PP. The alert fault detection system of clause NN or OO, wherein further comprising a second analog input to obtain an analog electrical signal from the audio path of the audio alert generation system at a point between a digital-to-analog converter and the speaker and an analog-to-digital converter to convert the analog electrical signal into a second digitally-formatted obtained audio signal, and wherein the fault detection module is to further cause the processor to detect the fault by comparing the second digitally-formatted obtained audio signal with the stored digital alert audio file and comparing the second digitally-formatted obtained audio signal with the digitally-formatted obtained audio signal.

QQ. The alert fault detection system of clause MM, wherein the input is to obtain an analog electrical signal from the audio path of the audio alert generation system at a point between a digital-to-analog converter and the speaker.

RR. The alert fault detection system of claim QQ, wherein the input further includes an analog-to-digital converter to convert the obtained analog electrical signal to the signal.

SS. The alert fault detection system of claim MM, wherein in input is to obtain a digital bitstream signal from an audio driver within the audio alert generation system.

TT. The alert fault detection system of any one of clauses MM to SS, wherein the fault detection module is to receive a trigger signal to cause it to convert and detect, and wherein the trigger signal signals that an alert is about the generated by the audio alert generating system.

UU. The alert fault detection system of clause TT, wherein the trigger signal includes the digital alert audio file or an identifier for the digital alert audio file.

VV. The alert fault detection system of any one of clauses MM to UU, wherein the fault detection module is to detect the fault by determining that the digitally-formatted obtained audio signal differs from the stored digital alert audio file by more than a threshold amount.

WW. The alert fault detection system of any one of clauses MM to VV, wherein the audio alert generation system and the alert fault detection system are located within a vehicle.

XX. The alert fault detection system of any one of clauses MM to WW, wherein the fault detection module is to trigger a fault indicator by at least one of outputting a fault signal, visually signaling a fault condition, haptically signaling a fault condition, or transmitting a message to a remote device regarding the fault.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of fault detection for an audio alert generation system, the method comprising:

in the audio alert generation system, selecting a stored digital alert audio file to be processed to generate an analog audio signal to drive a speaker; and in an alert fault detection system, obtaining a signal from the audio alert generation system, wherein obtaining the signal includes obtaining the signal from a microphone measuring sound, converting the obtained signal to a digitally-formatted obtained audio signal, obtaining an analog electrical signal from the audio alert generation system at a point between a digital-to-analog converter and the speaker, converting the analog electrical signal into a second digitally-formatted obtained audio signal, detecting a fault in the audio alert generation system by comparing the digitally-formatted obtained audio signal with the stored digital alert audio file, comparing the second digitally-formatted obtained audio signal with the stored digital alert audio file, and comparing the second digitally-formatted obtained audio signal with the digitally-formatted obtained audio signal, and triggering a fault indicator.

2. The method of claim 1, wherein converting the obtained signal includes analog-to-digital conversion.

3. The method of claim 1, wherein converting the analog electrical signal includes analog-to-digital conversion.

4. The method of claim 1, wherein obtaining the signal includes obtaining a digital bitstream signal from an audio driver within the audio alert generation system.

5. The method of claim 1, further comprising the alert fault detection system receiving a trigger signal prior to the obtaining, wherein the trigger signal signals that an alert is about to be generated by the audio alert generating system.

6. The method of claim 5, wherein the trigger signal includes the digital alert audio file or an identifier for the digital alert audio file.

7. The method of claim 1, wherein detecting the fault includes determining that the digitally-formatted obtained audio signal differs from the stored digital alert audio file by more than a threshold amount.

8. The method of claim 1, wherein the audio alert generation system and the alert fault detection system are located within a vehicle.

9. The method of claim 1, wherein triggering a fault indicator includes at least one of outputting a fault signal, visually signaling a fault condition, haptically signaling a fault condition, or transmitting a message to a remote device regarding the fault.

10. An alert fault detection system for fault detection in an audio alert generation system, wherein the audio alert generation system includes a speaker, an audio path, and a stored digital alert audio file to be processed in the audio path to generate an analog audio signal to drive the speaker, wherein the alert fault detection system comprises:

a processor;

a memory coupled to the processor;

an input for obtaining a signal from the audio alert generation system, wherein the input includes a microphone to obtain the signal from the acoustic environment a second analog input to obtain an analog electrical signal from the audio path of the audio alert generation system at a point between a digital-to-analog converter and the speaker;

an analog-to-digital converter to convert the analog electrical signal into a second digitally-formatted obtained audio signal; and a fault detection module including processor executable instructions stored in the memory that, when executed, cause the processor to convert the obtained signal to a digitally-formatted obtained audio signal, detect a fault in the audio alert generation system by comparing the digitally-formatted obtained audio signal with the stored digital alert audio file, comparing the second digitally-formatted obtained audio signal with the stored digital alert audio file, and comparing the second digitally-formatted obtained audio signal with the digitally-formatted obtained audio signal, and trigger a fault indicator.

11. The alert fault detection system of claim 10, wherein the input further includes an analog-to-digital converter to convert an analog signal obtained by the microphone into the digitally-formatted obtained signal.

12. The alert fault detection system of claim 10, wherein in input is to obtain a digital bitstream signal from an audio driver within the audio alert generation system.

13. The alert fault detection system of claim 10, wherein the fault detection module is to receive a trigger signal to cause it to convert and detect, and wherein the trigger signal signals that an alert is about to be generated by the audio alert generating system.

14. The alert fault detection system of claim 13, wherein the trigger signal includes the digital alert audio file or an identifier for the digital alert audio file.

15. The alert fault detection system of claim 10, wherein the fault detection module is to detect the fault by determining that the digitally-formatted obtained audio signal differs from the stored digital alert audio file by more than a threshold amount.

16. The alert fault detection system of claim 10, wherein the audio alert generation system and the alert fault detection system are located within a vehicle.

17. The alert fault detection system of claim 10, wherein the fault detection module is to trigger a fault indicator by at least one of outputting a fault signal, visually signaling a fault condition, haptically signaling a fault condition, or transmitting a message to a remote device regarding the fault.

* * * * *